United States Patent [19]
Furukawa et al.

[11] Patent Number: 5,956,969
[45] Date of Patent: Sep. 28, 1999

[54] HYDROGEN DISCHARGER AND APPARATUS COMPRISING THE SAME

[75] Inventors: Masahiro Furukawa; Shoichi Turuta, both of Gunma-ken, Japan

[73] Assignee: Sanyo Electric Co., Ltd., Osaka-fu, Japan

[21] Appl. No.: 09/093,216

[22] Filed: Jun. 8, 1998

[30] Foreign Application Priority Data

Apr. 27, 1998 [JP] Japan ................... 10-117018

[51] Int. Cl.$^6$ .......................... F25B 43/04; B01D 53/22; C01B 3/56
[52] U.S. Cl. ................................. 62/475; 62/85
[58] Field of Search ............... 62/475, 474, 85, 62/476

[56] References Cited

U.S. PATENT DOCUMENTS

| | | | |
|---|---|---|---|
| 2,730,869 | 1/1956 | Stubblefield | 62/475 |
| 2,751,759 | 6/1956 | Whitlow | 62/475 |
| 4,007,606 | 2/1977 | Yoshio | 62/475 |
| 5,111,670 | 5/1992 | Furukawa et al. | 62/475 |

FOREIGN PATENT DOCUMENTS 5-9001  1/1993  Japan .
6-194010  7/1994  Japan .

*Primary Examiner*—William Doerrler
*Attorney, Agent, or Firm*—Weingarten, Schurgin, Gagnebin & Hayes LLP

[57] ABSTRACT

A hydrogen discharger comprising hydrogen discharge pipes for discharging hydrogen from hydrogen-containing gas contained therein, which are made from palladium and constituted to be satisfactory in terms of discharge efficiency, heating and sealing and an apparatus comprising the hydrogen discharger such as an absorption type refrigerating apparatus. A plurality of hydrogen discharge pipes of a hydrogen discharger are provided and a heater is installed therebetween to improve heating efficiency. An open end portion having a conical inner surface of the hydrogen discharge pipe and a nozzle portion having a conical outer surface with a plurality of stepped portions of an introduction pipe are connected to each other by pressure to ensure sealing. The hydrogen discharge pipe is made from an alloy comprising 20 to 30% of silver and the balance consisting of palladium so that the hydrogen discharge pipe is suitable for various hydrogen discharge applications. Particularly, an alloy containing 23% of silver and the balance consisting of palladium makes it possible to provide a hydrogen discharge pipe which is excellent in hydrogen discharge characteristics and heating characteristics.

16 Claims, 13 Drawing Sheets

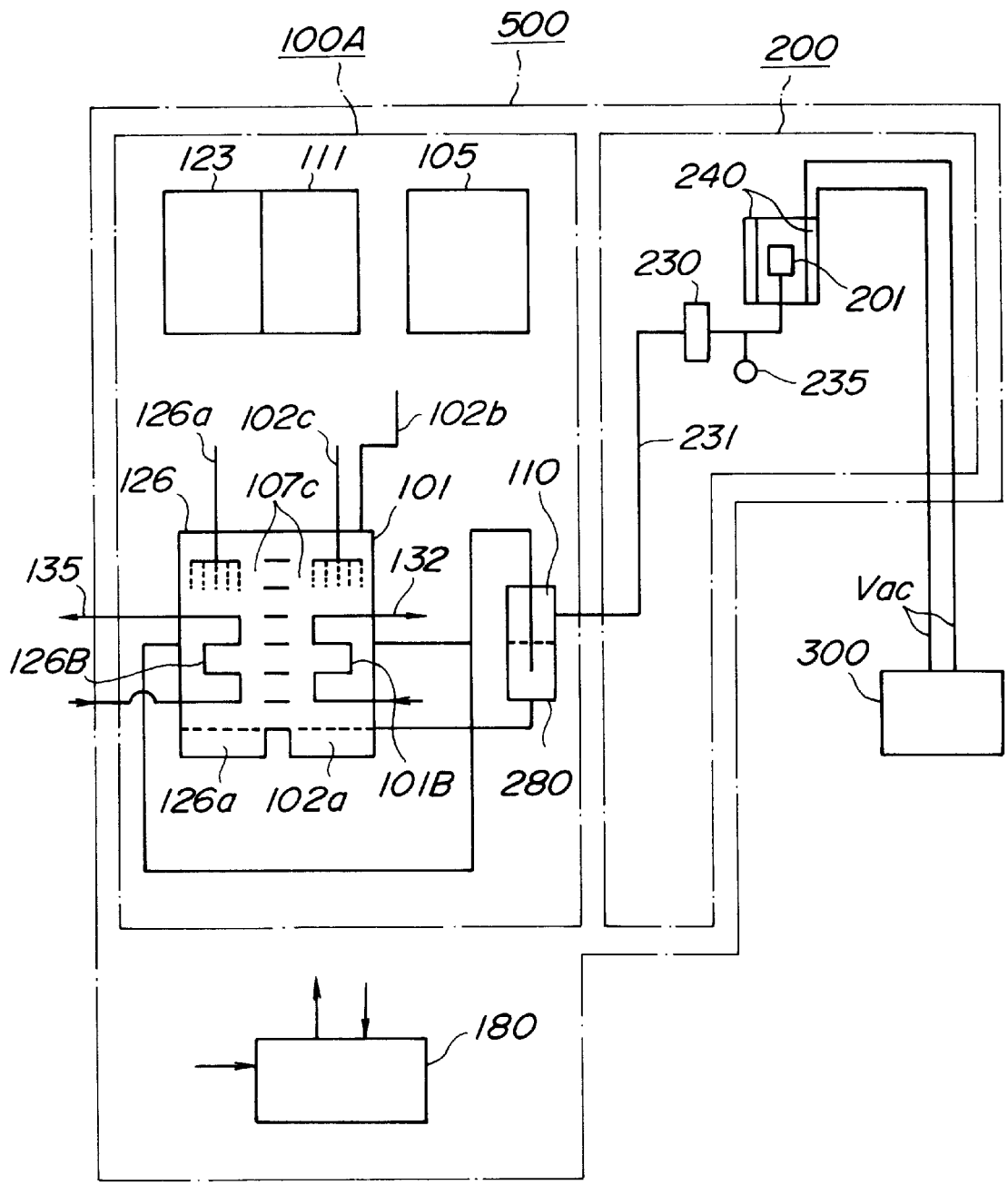

HYDROGEN DISCHARGER AND APPARATUS COMPRISING THE SAME

BACKGROUND OF THE INVENTION

1. Field of the Invention

The present invention relates to a hydrogen discharger and an apparatus comprising the same. More specifically, it relates to a hydrogen discharger for discharging only hydrogen from hydrogen-containing gas in a container made from palladium or palladium alloy by heating the container from outside with a heater and to an apparatus comprising the same, for example, an absorption type refrigerating apparatus.

2. Background Art

This type of hydrogen discharger 200 (to be referred to as "first prior art" hereinafter) constituted as shown in FIGS. 11A, 11B, 12A, and 12B is disclosed by Japanese Laid-open Patent Application No. Hei 5-9001. In the following diagrams, parts denoted by the same reference symbols have the same functions as parts having the same reference symbols described in any one of the diagrams.

In FIG. 11A, a gas generator 100 is an apparatus for generating gas 110 containing hydrogen (to be referred to as "hydrogen-containing gas" in the present invention) like an absorption type refrigerator, for example, which will be described hereinafter and for the operation function of which hydrogen is bad.

The hydrogen-containing gas 110 passes through a switch valve 230, is introduced into a hydrogen discharge pipe 201 (to be referred to as "palladium cell" hereinafter) made from palladium or palladium alloy and stored. The cylindrical palladium cell 201 has a closed portion 201A at one end and an open portion 201B at the other end. The hydrogen-containing gas 110 is introduced from the open portion 201B. In this prior art, when the material of the palladium cell 201 is a palladium alloy, the palladium alloy comprises 75% of palladium and 25% of silver.

The valve body 230B of the switch valve 230 is driven by an electric actuator 230A, such as a plunger using a solenoid coil, or a motor to open or close a flow from a passage 231 to a passage 232. The pressure of the hydrogen-containing gas 110 in the palladium cell 201, that is, internal pressure is detected by a pressure detector 235 while the hydrogen-containing gas 110 is introduced into the palladium cell 201 by opening the switch valve 230. When the internal pressure becomes a predetermined pressure, for example, 10,666 Pa, that is, ca. 80 mmHg at this point, the switch valve 230 is closed.

Around the palladium cell 201, an electric heater 240 is formed cylindrical to surround the palladium cell 201 and AC voltage is applied to the electric heater 240 from an AC power source 300 through feeder lines 151 to heat the palladium cell 201. In another prior art, a single rod-shaped heater is arranged next to and parallel to a single hydrogen discharger (not shown).

Only hydrogen contained in the hydrogen-containing gas 110 is permeated to the outside of the palladium cell 201 by increasing the temperature of the palladium cell 201 to 300° C. to 350° C. so that hydrogen which is bad for the operation function of the gas generator 100 can be removed.

The electric heater 240 is a sheath heater formed cylindrical or a heating unit covered with silicon rubber or the like. When the temperature of the palladium cell 201 exceeds 400° C., according to application AC voltage or the size and heat capacity of the palladium cell 201, the thickness of the sheath such as silicon rubber is adjusted to control the temperature.

However, in the above prior art, only heat generated from the inner peripheral surface of the cylindrical electric heater 240 heats the palladium cell 201 and heat generated from the outer peripheral surface of the electric heater 240 is wasted. Therefore, it is difficult to carry out heating for promoting the discharge of hydrogen efficiently.

In the unshown rod-shaped heater, only heat generated from one side surface of the heater heats the palladium cell and heat generated from the other three side surfaces is wasted. Therefore, it is also difficult to carry out heating efficiently.

Meanwhile, the difference of the constitution of FIG. 12A from the constitution of FIG. 11A is that the palladium cell 201 which is a hydrogen discharge pipe is formed cylindrical and bent like letter U so that the hydrogen-containing gas 110 is introduced from open portions 201B at both ends of the U-shaped palladium cell 201. The electric heater 240 is formed oval to increase the discharge surface of hydrogen, that is, the outer peripheral surface of the palladium cell 201 facing the inner surface of the electric heater 240.

Further, an absorption type refrigerating apparatus 500 (shown in FIG. 13, to be referred to as "second prior art" hereinafter) in which the gas generator 100 of the above first prior art is used as an absorption type refrigerator 100A and the hydrogen-containing gas 100 generated inside the absorption type refrigerator 100A is supplied to the hydrogen discharger 200 to be removed is disclosed by Japanese Laid-open Patent Application No. Hei 6-194010.

The absorption type refrigerator 100A is an absorption type refrigerator for carrying out only cooling operation for cooling a required fluid, for example, brine based on the absorption function and evaporation function of an absorption solution, in which only cooling is a load, or an absorption type refrigerator for carrying out heating operation for heating a required fluid, for example, brine based on heat obtained by heating an absorption solution and heat generated by an absorption function in addition to cooling operation, that is, an absorption type cold/hot water apparatus in which both cooling and heating are loads. In the present invention, these are generally called "absorption type refrigerator".

In the absorption type refrigerator 100A shown in FIG. 13, a concentrated absorption solution 102c is sprinkled into an absorber 101 to absorb refrigerant vapor 107c and a diluted absorption solution 102a obtained by cooling absorption heat with cooling water 132 passing through a cooling pipe 101B is heated with a high-temperature regenerator 105 to evaporate it and obtain refrigerant vapor (not shown).

The concentrated absorption solution 102c is obtained by evaporating refrigerant vapor from an intermediate solution 102b by hot evaporated refrigerant vapor in a low-temperature regenerator 111, and also cold water 135 is obtained by sprinkling a low-temperature liquid refrigerant 126a obtained by condensing refrigerant vapor with a condenser 123 from above into an evaporator 126 while storing the liquid refrigerant 126a in a bottom portion of the evaporator 126 to cool brine, for example, water passing through a heat exchange pipe 126B. Thereby, the above cooling operation is carried out.

The refrigerant vapor 107c obtained by evaporating the liquid refrigerant 126a through the absorption of heat from the heat exchange pipe 126B passes through a passage between the evaporator 126 and the absorber 101, enters the absorber 101, and is absorbed into the above sprinkled concentrated absorption solution 102c to become the diluted absorption solution 102a again. Thus, the circulation of the absorption solution and the refrigerant is carried out.

Without circulating the above refrigerant vapor 107c and the liquid refrigerant 126a and cooling with the cooling water 132, the diluted absorption solution 102a obtained in the absorber 101 is heated in the high-temperature regenerator 105 to obtain high-temperature refrigerant vapor and the intermediate solution 102b having an intermediate concentration which are circulated in the absorber 101 and the evaporator 126 to heat brine, for example, water passing through the heat exchange pipe 126B, thereby obtaining hot water 135. Thus, the above heating operation is carried out.

The above cooling operation and heating operation are controlled by a control unit 180. The control unit 180 outputs control signals for controlling, for example, a pump for circulating the absorption solution, the switch valve for opening or closing circulation passages, a heating volume control valve for heating the absorption solution and the like through control processing using, for example, a microcomputer based on operation signals from parts for setting required operation conditions and detection signals obtained by detecting the temperature or the like at each part.

The above absorption solution may circulate in a portion heated at a high temperature, for example, 160° C. Therefore, an absorbing agent contained in the absorption solution, for example, lithium bromide, reacts with a stainless steel material constituting each unit or pipe to generate hydrogen which is contained in the refrigerant vapor 107c. Since this hydrogen and nitrogen and oxygen both of which are leaked in when connection portions of each pipe and unit are interconnected are not condensed by the operation function of the absorption type refrigerator 100A, they are contained in the refrigerant vapor 107c as a gas.

Nitrogen and oxygen do not increase but hydrogen increases in quantity along with the passage of time. Therefore, such uncondensed gas reduces the content of the refrigerant vapor 107c in the absorber 101 and the evaporator 126, thereby reducing the efficiency of the absorption function.

Accordingly, the refrigerant vapor 107c is introduced into a gas/liquid separator 280 from the absorber 101 and the evaporator 126 to be cooled and condensed, whereby uncondensed gas, that is, the above hydrogen-containing gas 110 is separated and supplied to the hydrogen discharger 200 from the passage 231 to be discharged, thereby eliminating the above inconvenience.

Further, the above Japanese Laid-open Patent Application No. Hei 6-194010 also discloses an absorption type refrigerating apparatus 500 (shown in FIG. 14, to be referred to as "third prior art" hereinafter) in which a plurality of the hydrogen discharger 200 shown in FIG. 13 are provided so that the hydrogen-containing gas 110 is introduced into the hydrogen dischargers 200 sequentially to improve the hydrogen discharge efficiency.

In FIG. 14, each passage 231 for introducing the hydrogen-containing gas 110 into each hydrogen discharger 200 from the gas/liquid separator 280 is provided with a switch valve 230, a pressure detector 235 and a relay 250, and the control unit 180 controls to activate the hydrogen dischargers 200 sequentially based on the detection signals of the pressure detectors 235.

Stated more specifically, the switch valve 230 of the passage 231 of the first hydrogen discharger 200, for example, a hydrogen discharger 200 at the highest position is opened to introduce the hydrogen-containing gas 110 into the palladium cell 201 and is closed based on the detection signal of the pressure detector 235 when the pressure of the hydrogen-containing gas 110 in the palladium cell 201 becomes a predetermined value.

Thereafter, the switch valve 230 of the passage 231 of the second hydrogen discharger 200, for example, a hydrogen discharger 200 at the intermediate position is opened to introduce the hydrogen-containing gas 110 into the palladium cell 201 and is closed based on the detection signal of the pressure detector 235 when the pressure of the hydrogen-containing gas 110 in the palladium cell 201 becomes a predetermined value.

Thereafter, the switch valve 230 of the passage 231 of the third hydrogen discharger 200, for example, a hydrogen discharger 200 at the lowest position is opened to introduce the hydrogen-containing gas 110 into the palladium cell 201 and is closed based on the detection signal of the pressure detector 235 when the pressure of the hydrogen-containing gas 110 in the palladium cell 201 becomes a predetermined value.

Then, the control unit 180 controls such that the same operation is repeated from the first hydrogen discharger 200 again. The supply of AC power Vac to the electric heater 240 by the relay 250 is continued for a time period from the time when the switch valve 230 is closed to the time when the pressure of the hydrogen-containing gas in the palladium cell 201 becomes a predetermined value or less.

Since the palladium cell 201 is heated and cooled by heat radiation repeatedly during that time, the hydrogen-containing gas 110 leaks out from a joint between the open portion 201B of the palladium cell 201 and the nozzle portion of the passage 232. Therefore, it has been desired to provide a hydrogen discharger 200 which eliminates the above inconvenience and an apparatus comprising the same, for example, an absorption type refrigerating apparatus 500.

In the hydrogen discharger 200 of the above first prior art, as the palladium alloy used in the palladium cell 201 comprises 25% of silver and the balance consisting of palladium, the material of the palladium cell 201 has such high durability that it is rarely destroyed by heat.

However, palladium cells 201 having different shapes must be produced according to application purpose. When a palladium cell 201 having a complex shape, for example, the shape shown in FIG. 12A, is to be produced, a slightly soft material having high workability is preferably used. When a palladium cell 201 having a simple shape is to be produced, a hard material having excellent durability is preferably used. Therefore, it is necessary to select which material to be used in the palladium cell 201.

SUMMARY OF THE INVENTION

In view of the above problems, it is a first object of the present invention to provide a hydrogen discharger which comprises a heater, a hydrogen discharge pipe, having one closed end, for introducing hydrogen-containing gas from the other open end, permeating hydrogen from inside by heating with the heater and discharging hydrogen to the outside, and an introduction pipe, connected to the hydrogen discharge pipe, for introducing the hydrogen-containing gas into the hydrogen discharge pipe, wherein a plurality of the hydrogen discharge pipes are provided, the heater is located between adjacent hydrogen discharge pipes, and the hydrogen discharge pipes are arranged symmetrical about and adjacent to the heater.

It is a second object of the present invention to provide a hydrogen discharger which comprises a heater, a hydrogen discharge pipe, having one closed end and made from palladium or palladium alloy, for introducing hydrogen-containing gas from the other open end, transmitting hydrogen from inside by heating with the heater and discharging hydrogen to the outside, and an introduction pipe, connected to the hydrogen discharge pipe, for introducing the hydrogen-containing gas into the hydrogen discharge pipe, wherein the open end portion of the hydrogen discharge pipe has a conical inner surface, and the introduction pipe has a nozzle portion with a stepped conical outer surface having a series of annular groove portions and annular mountain portions, which is in contact with the conical inner surface of the hydrogen discharge pipe to change the shape of the conical inner surface of the hydrogen discharge pipe and an introduction hole for introducing the hydrogen-containing gas.

Further, it is a third object of the present invention to provide a hydrogen discharger wherein the palladium alloy comprises 20% or more or 30% or less of silver and the balance consisting of palladium.

It is a fourth object of the present invention to provide a hydrogen discharger wherein the palladium alloy comprises about 23% of silver and the balance consisting of palladium.

It is a fifth object of the present invention to provide an absorption type refrigerating apparatus comprising a hydrogen discharger constituted as described above.

BRIEF DESCRIPTION OF THE DRAWINGS

These and other objects and advantages of the present invention will become clear from the following description with reference to the accompanying drawings, wherein:

FIG. 13 is a block diagram of a absorption type refrigerating apparatus comprising a hydrogen discharger.

DETAILED DESCRIPTION OF THE PREFERRED EMBODIMENTS

The present invention is described in detail hereinafter with reference to embodiments shown in the accompanying drawings.

Figure 1:
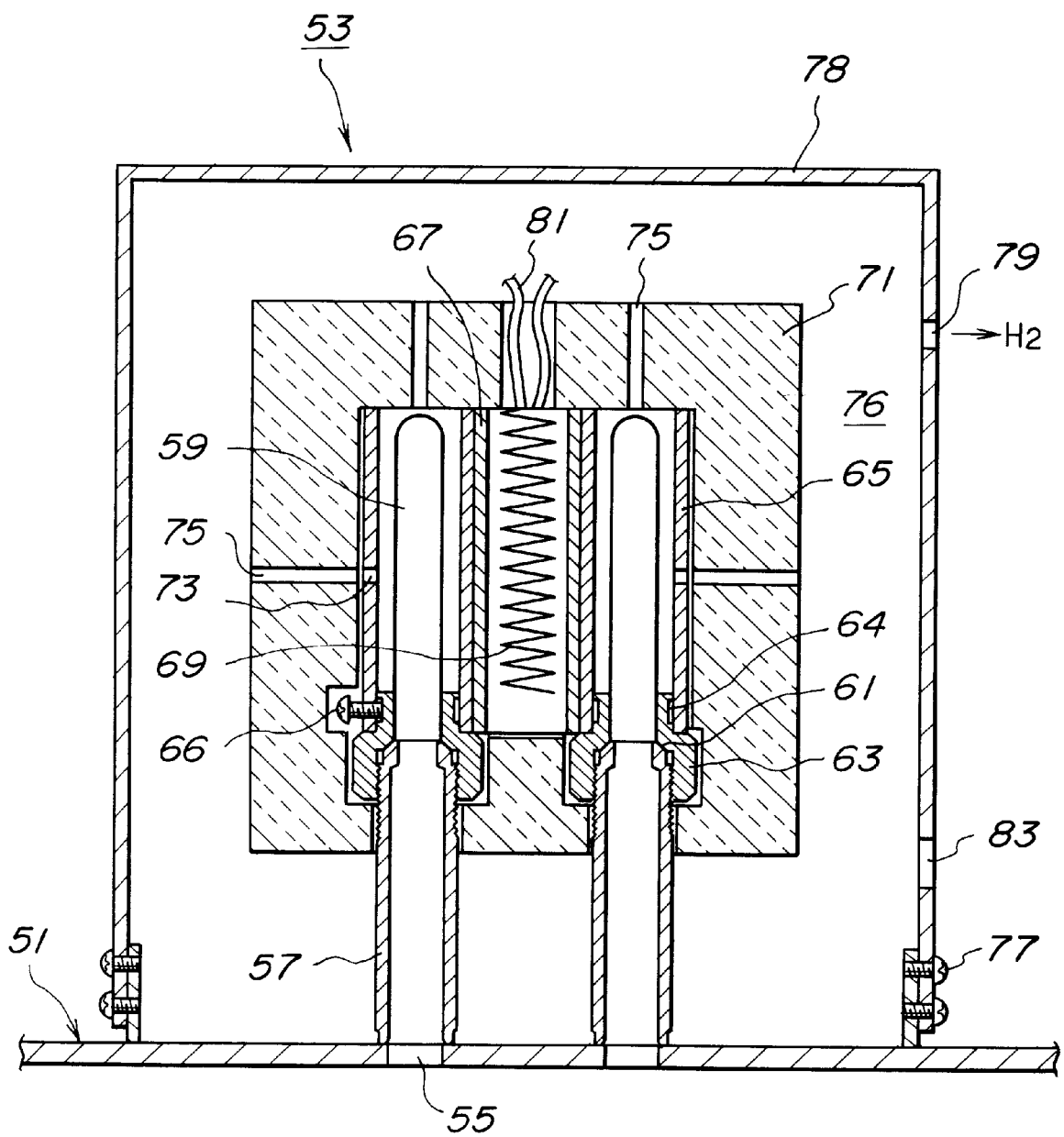
FIG. 1 is a longitudinal sectional view of a hydrogen discharger according to an embodiment of the present invention.
Figure 2:
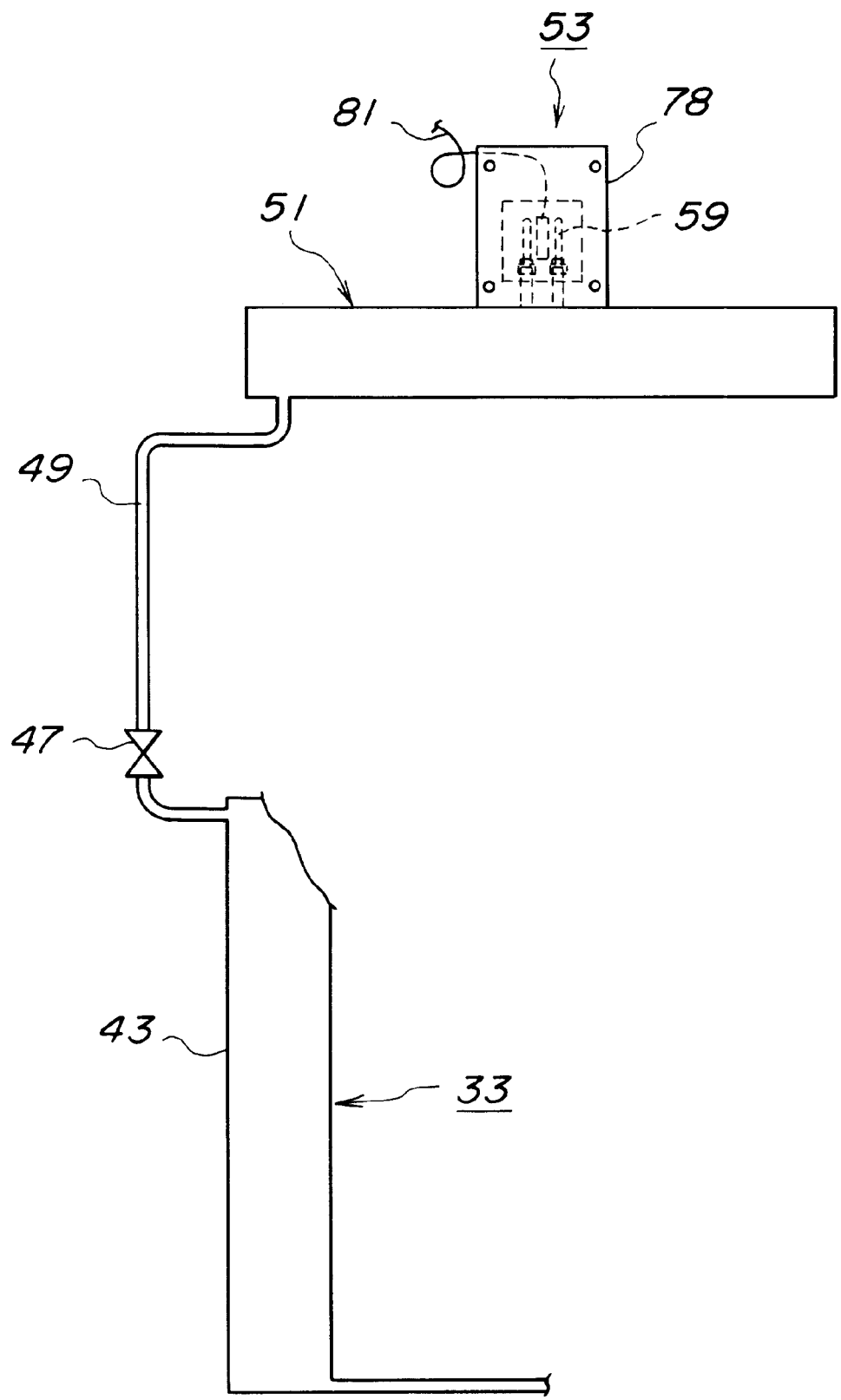
FIG. 2 is a diagram of a cycle near an uncondensed gas tank equipped with the hydrogen discharger of FIG. 1.
Figure 3:
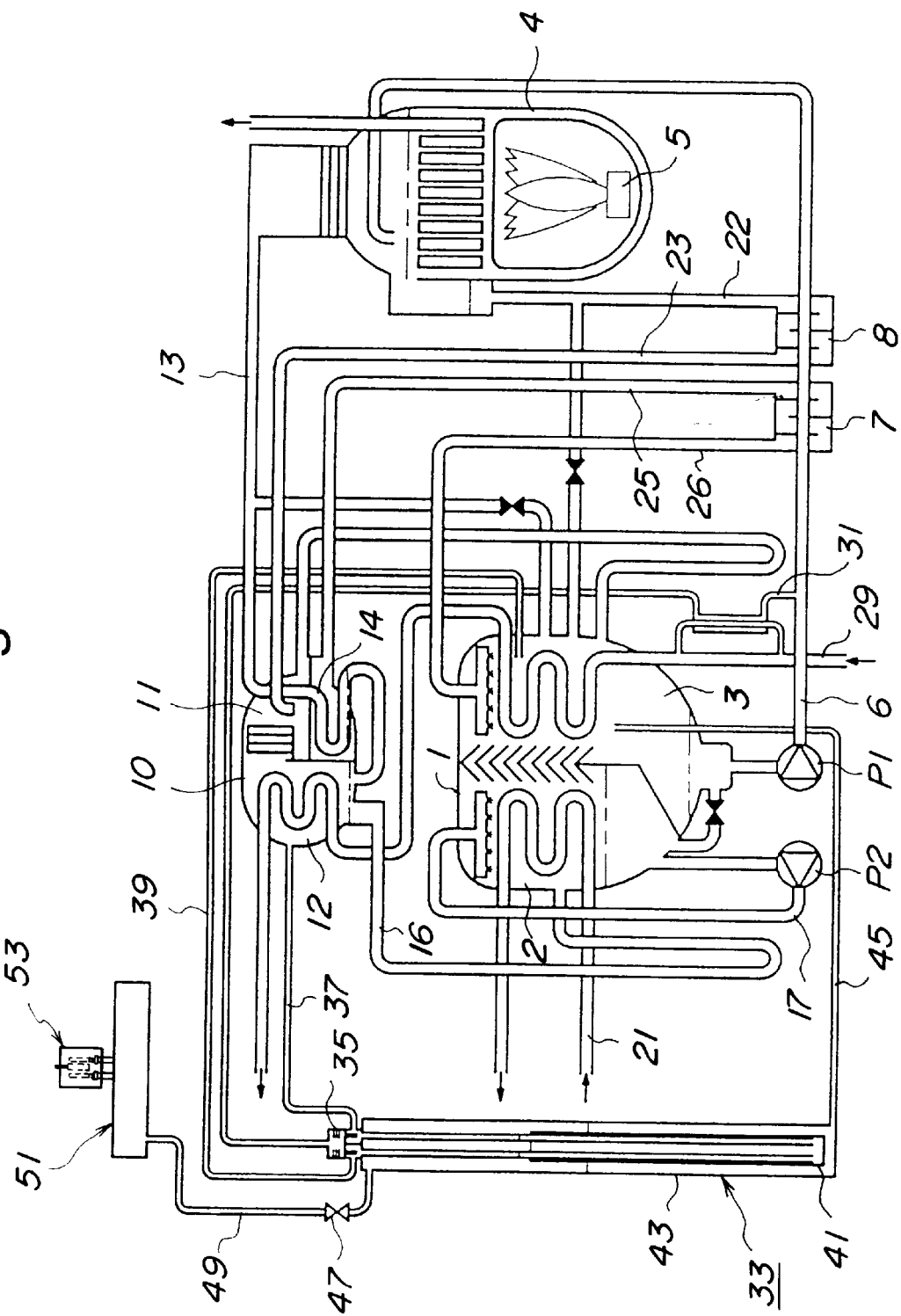
FIG. 3 is a cycle diagram of a absorption type refrigerator provided with the hydrogen discharger of FIG. 1 and the uncondensed gas tank of FIG. 2.

An embodiment of the present invention is shown in FIGS. 1 to 3.

With reference to FIG. 3, the configuration of an absorption type refrigerator, an apparatus comprising a hydrogen discharger according to this embodiment, is first outlined. Reference numeral 1 denotes an evaporator/absorber barrel (lower barrel) incorporating an evaporator 2 and an absorber 3. Reference numeral 4 denotes a high-temperature regenerator equipped with a burner 5. An absorption solution pump P1, a low-temperature heat exchanger 7 and a high-temperature heat exchanger 8 are provided along a diluted absorption solution pipe 6 extending from the absorber 3 to the high-temperature regenerator 4.

Reference numeral 10 indicates a high-temperature barrel (upper barrel) incorporating a low-temperature regenerator 11 and a condenser 12. Reference numeral 13 denotes a refrigerant vapor pipe extending from the high-temperature regenerator 4 to the low-temperature regenerator 11, 16 a liquid refrigerant downflow pipe extending from the condenser 12 to the evaporator 2, 17 a refrigerant circulation pipe connected to the evaporator 2, P2 a refrigerant pump and 21 a cold water pipe connected to the evaporator 2.

Reference numeral 22 indicates an intermediate absorption solution pipe extending from the high-temperature regenerator 4 to the high-temperature heat exchanger 8, 23 an intermediate absorption solution pipe extending from the high-temperature heat exchanger 8 to the low-temperature regenerator 11, 25 a condensed absorption solution pipe extending from the low-temperature regenerator 11 to the low-temperature heat exchanger 7, 26 a condensed absorption solution pipe extending from the low-temperature heat exchanger 7 to the absorber 3, and 29 a cooling water pipe.

During the operation of the above constituted absorption type refrigerator, the burner 5 of the high-temperature regenerator 4 operates, a diluted absorption solution such as an aqueous solution of lithium bromide (LiBr) (containing a surfactant) flowing from the absorber 3 is heated and boiled, and refrigerant vapor ($H_2O$) is separated from the diluted absorption solution. Thereby, the diluted absorption solution is condensed to become an intermediate absorption solution.

The refrigerant vapor flows into the low-temperature regenerator 11 through the refrigerant vapor pipe 13. This refrigerant vapor flows through the heater 14 in the low-temperature regenerator 11 to heat the intermediate absorption solution from the high-temperature regenerator 4, whereby the refrigerant vapor is cooled and condensed to become a liquid refrigerant and flows into the condenser 12.

Refrigerant vapor is generated from the heated intermediate absorption solution and flows into the condenser 12. The refrigerant vapor flowing from the low-temperature regenerator 11 is cooled and condensed in the condenser 12 and flows through the refrigerant downflow pipe 16 into the evaporator 2 together with the liquid refrigerant from the low-temperature regenerator 11.

In the evaporator 2, the liquid refrigerant is circulated in the refrigerant circulation pipe 17 and sprinkled by the operation of the refrigerant pump P2. Cold water whose temperature is lowered by cooling by this sprinkling is supplied to a load. The refrigerant vapor evaporated by the evaporator 2 flows into the absorber 3 and is absorbed into the sprinkled absorption solution.

Meanwhile, the intermediate absorption solution whose concentration is increased by the separation of refrigerant vapor in the high-temperature regenerator 4 flows into the low-temperature regenerator 11 through the intermediate absorption solution pipe 22, the high-temperature heat exchanger 8 and the intermediate absorption solution pipe 23. The intermediate absorption solution is heated by the heater 14 through which the refrigerant vapor from the high-temperature regenerator 4 runs. Refrigerant vapor is separated from the intermediate absorption solution to become a concentrated absorption solution having a further increased concentration.

The concentrated absorption solution heated and condensed in the low-temperature regenerator 11 flows into the condensed absorption solution pipe 25, passes through the heat exchanger 7 and the condensed absorption solution pipe 26 into the absorber 3, is sprinkled and dropped over the cooling water pipe 29. The absorption solution absorbs refrigerant vapor from the evaporator 2 to increase the concentration of a refrigerant. The diluted absorption solution having an increased concentration of the refrigerant is driven by the drive force of the absorption solution pump P1, preheated by the low-temperature heat exchanger 7 and the high-temperature heat exchanger 8 and flows into the high-temperature regenerator 4.

Thus, cold water whose temperature is lowered by cooling when it passes through the cold pipe 21 connected to the evaporator 2 is supplied to a cold water load. Hot water which has passed through the cooling water pipe 29 and whose temperature is increased by cooling the concentrated absorption solution sprinkled in the absorber 3 and the refrigerant vapor in the condenser 12 is supplied to a hot water load.

Part of the absorption solution driven by the drive force of the absorption solution pump P1 flows into the executor 35 of a gas/liquid separator 33 through an absorption solution feed pipe 31. Uncondensed gas stored in the condenser 12 and the absorber 3 is introduced into the executor 35 through gas introduction pipes 37 and 39, respectively, separated from an absorption solution in the separation tank 41 of the gas/liquid separator 33, and stored in a bleed air tank 43. The absorption solution in the bleed air tank 43 is returned to the absorber 3 through an absorption solution return pipe 45.

As shown in FIG. 2 and FIG. 1, an upper portion of the bleed air tank 43 of the gas/liquid separator 33 communicates with an uncondensed gas tank 51 through a communication pipe 49. This communication pipe 49 is provided with a stop valve 47. The hydrogen discharger 53 according to this embodiment is installed in the uncondensed gas tank 51.

As shown in FIG. 1, in the hydrogen discharger 53, hydrogen-containing gas introduction pipes 57 are connected to a plurality of hydrogen intake ports 55 which are open to the upper surface of the uncondensed gas tank 51. A palladium cell which is a hydrogen discharge pipe 59 for discharging hydrogen is connected to an upper end of each of the introduction pipes 57.

The hydrogen discharge pipe 59 is made from palladium or palladium alloy (containing about 23% of silver).

The connection of this hydrogen discharge pipe 59 is carried out by flaring the lower end of the hydrogen discharge pipe 59 according to the truncated conical shape 61 of the open end portion of the introduction pipe 57, placing the flared portion (unshown) on the portion of the truncated conical shape 61 and pressing them with a flare nut 63 from therearound. The upper end of the hydrogen discharge pipe 59 is closed.

A cylindrical hydrogen discharge pipe protection tube 65 is installed on the upper end of the flare nut 63 and arranged concentric with the hydrogen discharge pipe 59 when it is installed. This installation is carried out by forming an annular groove 64 in the peripheral surface of the upper end of the flare nut 63, fitting the hydrogen discharge pipe protection tube 65 onto the upper end of the flare nut 63, screwing a screw 66 into a screw hole formed through the side surface of the hydrogen discharge pipe protection tube 65 and inserting the end of the screw 66 into the annular groove 64. FIG. 1 shows only part of the screw 66 used for the installation.

At the center of a plurality of hydrogen discharge pipe protection tubes 65 arranged as described above, a cylindrical heater protection tube 67 is arranged close to and next to the hydrogen discharge pipe protection tubes 65. A rod-shaped heater 69 is installed inside the heater protection tube 67. The hydrogen discharge pipe protection tubes 65 are arranged symmetrical about the heater protection tube 67 in a circumferential direction.

These protection tubes 65 and 57 are made from a high heat conductive material such as copper alloy.

A heat insulating material 71 is provided to cover the outer surfaces of the heater protection tube 67 and the hydrogen discharge pipe protection tubes 65. Air holes 73 and 75 are formed through the hydrogen discharge pipe protection tube 65 and the heat insulating material 71 to discharge transmitted hydrogen to the outside, respectively.

A protecting case 78 is fixed to the top surface of the uncondensed gas tank 51 to cover the outer surface of the heat insulating material 71 with a predetermined gap 76 therebetween. An air hole 79 is formed through an upper portion of the protecting case 78 to discharge hydrogen having a low specific gravity. A hole 83 is formed through a lower portion of the protecting case 78 to take in air to be substituted with hydrogen or pass a lead wire 81 for the heater 69 therethrough.

Due to the above constitution, the uncondensed gas separated from the absorption solution in the separation tank 41 of the gas/liquid separator 33 is supplied from the bleed air tank 43 to the communication pipe 49 through the stop valve 47 and stored in the uncondensed gas tank 51. Further, the uncondensed gas reaches the hydrogen discharge pipe 59 through the hydrogen-containing gas introduction pipe 57.

Heat generated from the heater 69 is transmitted to the heater protection tube 67 to heat the hydrogen discharge pipe 59 and the uncondensed gas in the hydrogen discharge pipe 59 through the hydrogen discharge pipe protection tube 65 in close contact with the heater protection tube 67. By heating, hydrogen contained in the uncondensed gas permeates through the hydrogen discharge pipe 59. The permeated hydrogen is discharged to the outside through the air holes 73, 75, 79.

Since heat generated from the heater 69 at the center is transmitted to the plurality of hydrogen discharge pipes 59 arranged around the heater 69 in this embodiment as described above, heat is hardly wasted and heating by the heater 69 is carried out efficiently compared with the prior art in which a single hydrogen discharge pipe is provided.

Further, heat generated from the heater 69 is efficiently transmitted to the heater protection tube 67 because it is covered by the heat insulating material 71 and the heater protection tube 67 is made from a material having excellent heat conductivity. The heat transmitted to the heater protection tube 67 is also efficiently transmitted to the hydrogen discharge protection tubes 65 in close contact with the heater protection tube 67 for the same reason.

The formation of the air hole 73 in the hydrogen discharge pipe protection tube 65 reduces the need for providing a large gap between the hydrogen discharge pipe 59 and the hydrogen discharge pipe protection tube 65 unlike the prior art and makes it possible to locate the hydrogen discharge pipe 59 closer to the hydrogen discharge pipe protection tube 65. Thereby, heat transmission from the hydrogen discharge pipe protection tube 65 to the hydrogen discharge pipe 59 can be carried out efficiently.

Figure 4:
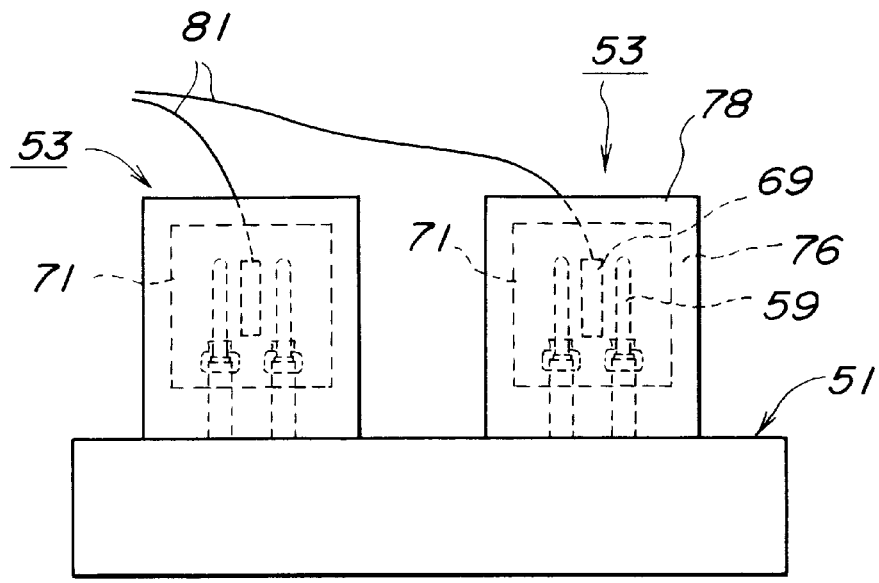
FIG. 4 is a schematic diagram of a hydrogen discharger and an uncondensed gas tank according to another embodiment.

In the above embodiment, only a single hydrogen discharger 53 is provided on the uncondensed gas tank 51. In another embodiment, as shown in FIG. 4, a plurality of hydrogen dischargers 53 may be provided on the uncondensed gas tank 51.

Figure 5:
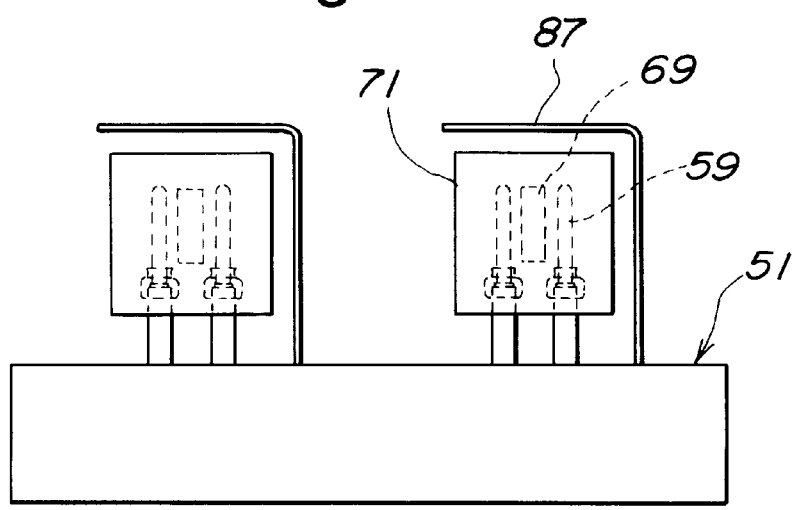
FIG. 5 is a schematic diagram of a hydrogen discharger and an uncondensed gas tank according to still another embodiment.

In the above embodiments, it is the protecting case 78 that protects the heater 69, the plurality of hydrogen discharge pipes 59 and the heat insulating material 71 for covering these. In another embodiment, as shown in FIG. 5, a protecting plate 87 may be used in place of the protecting case 78. This protecting plate 87 is welded to the uncondensed gas tank 51 and has an L-shaped section to cover the top of the heat insulating material 71.

Figure 6:
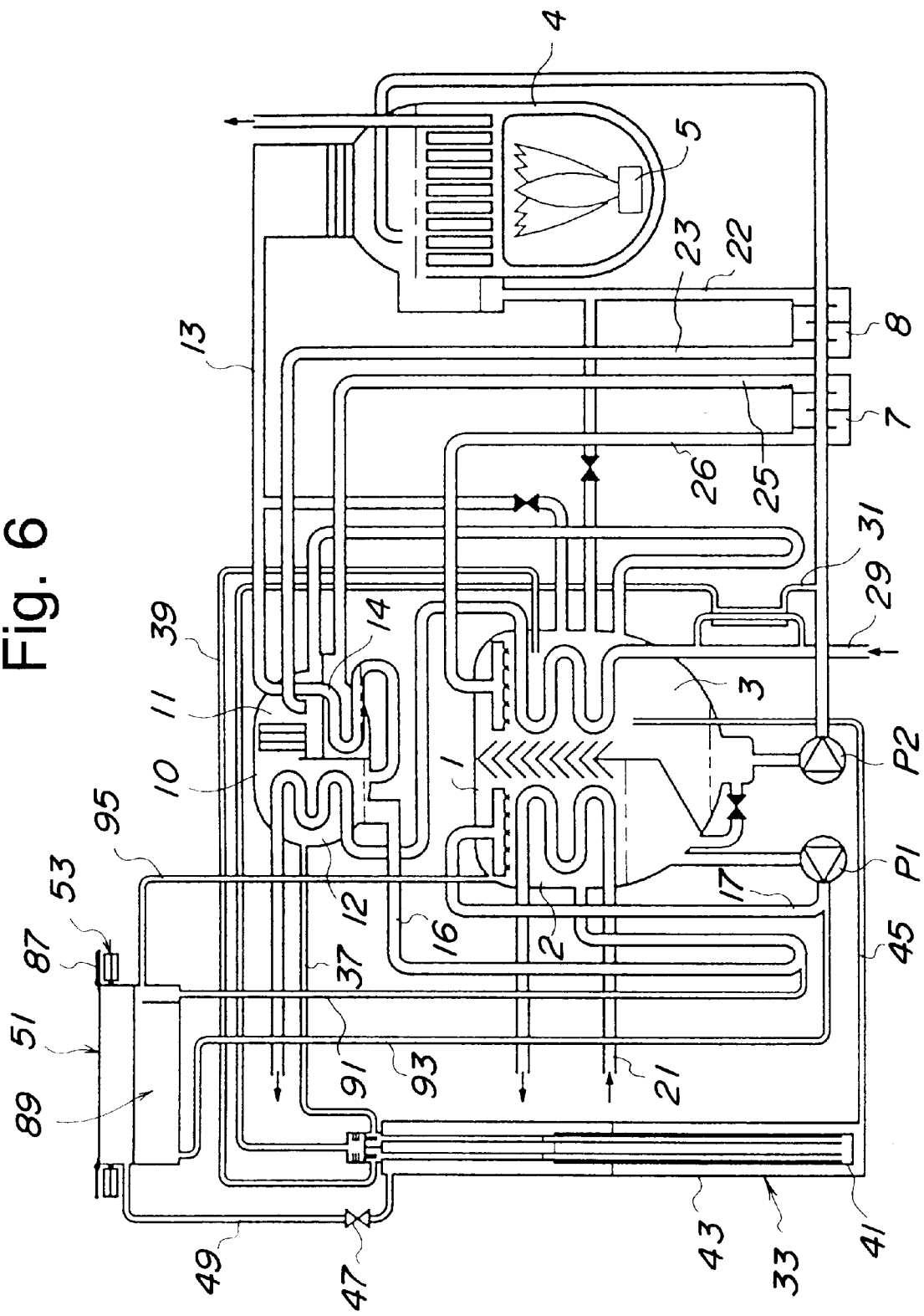
FIG. 6 is a cycle diagram of a absorption type refrigerator provided with a hydrogen discharger and an uncondensed gas tank according to a further embodiment.

In still another embodiment, as shown in FIG. 6, a cooling tank 89 for cooling the uncondensed gas tank 51 may be provided. This cooling is aimed to suppress pressure inside the uncondensed gas tank 51 and carried out by introducing the refrigerant of the evaporator 2. That is, the liquid refrigerant flowing down from the condenser 12 to the evaporator 2 through the liquid refrigerant downflow pipe 16 and the liquid refrigerant circulating in the refrigerant circulation pipe 17 by the refrigerant pump P2 in the evaporator 2 are introduced into the cooling tank 89 by refrigerant bypass pipes 91 and 93, respectively. The introduced refrigerant is evaporated in the cooling tank 89 and lowers ambient temperature to become refrigerant gas, and returned to the evaporator 2 through a refrigerant return pipe 95.

Figure 7:
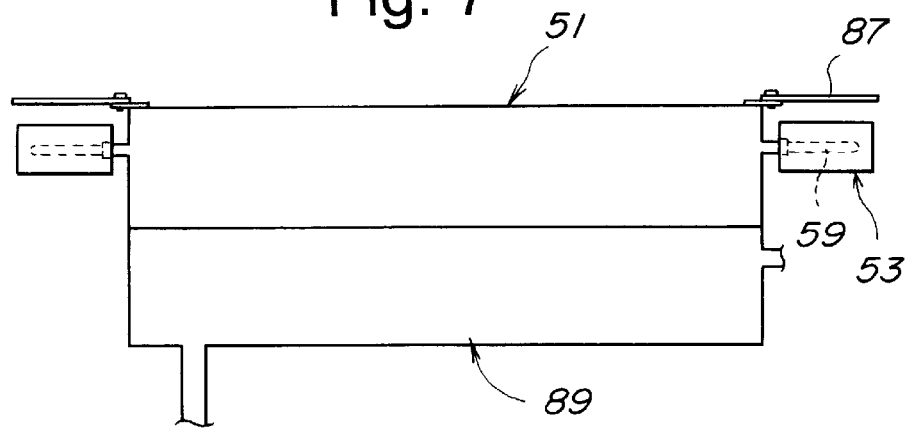
FIG. 7 is a schematic diagram of the hydrogen discharger and the uncondensed gas tank of FIG. 6.

In the above embodiments, the hydrogen discharger 53 is installed on the top of the uncondensed gas tank 51 and the hydrogen discharge pipes 59 are installed upright. In another embodiment, as shown in FIG. 6 and FIG. 7, the hydrogen discharge pipes 59 may be provided on the side surfaces of the uncondensed gas tank 51 horizontally.

In the above embodiments, as shown in FIG. 5, the protecting plate 87 has an L-shaped section. In another embodiment, as shown in FIG. 6 and FIG. 7, it may have a horizontally linear section.

Figure 8A:
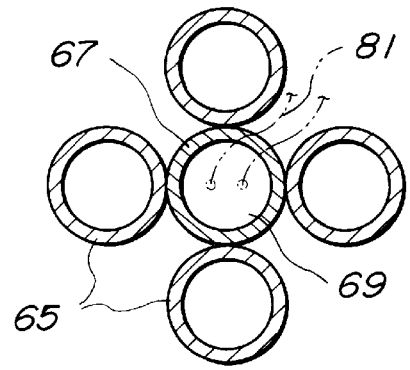
FIG. 8A is a horizontal sectional view showing the positional relationship between hydrogen discharge pipe protection tubes and a heater protection tube in the hydrogen discharger and FIG. 8B is a side view of FIG. 8A.
Figure 8B:
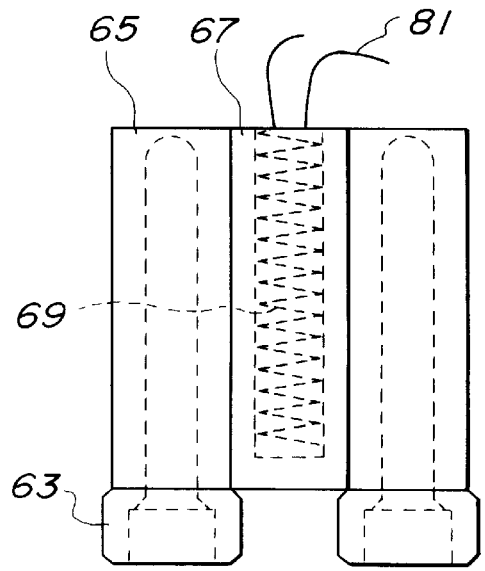

In the above embodiments, as shown in FIG. 1, two hydrogen discharge pipe protection tubes 65 are arranged symmetrical about the heater protection tube 67. In another embodiment, as shown in FIGS. 8A and 8B, four hydrogen discharge pipe protection tubes 65 may be arranged around the heater protection tube 67 in a circumferential direction. Further, not shown, the number of hydrogen discharge pipe protection tubes 65 may be 3 or 5 or more.

Since a plurality of hydrogen discharge pipes are arranged symmetrical about and adjacent to the heater at the center as described above, heat generated from the heater is hardly wasted and heating is carried out efficiently as compared with the case where a single hydrogen discharge pipe is provided.

Further, heat generated from the heater is efficiently transmitted to the hydrogen discharge pipes through the heater protection tube and the hydrogen discharge pipe protection tubes made from a material having excellent heat conductivity. Further, since the hydrogen discharge pipes are arranged in a circumferential direction, heat generated from the heater radially is more hardly wasted.

Moreover, since an air hole for discharging hydrogen to the outside is formed through the hydrogen discharge pipe protection tube, the need for forming a large gap for discharging hydrogen to the outside between the hydrogen discharge pipe and the hydrogen discharge pipe protection tube is reduced. Thereby, the hydrogen discharge pipe and the hydrogen discharge pipe protection tube can be located closer to each other and heat transmission efficiency is further improved.

Further, since the heat insulating material is provided to cover the outer surfaces of the heater protection tube and the hydrogen discharge pipe protection tubes, heat is hardly escaped and heating is carried out efficiently.

Further, since the hydrogen discharge pipe is connected in such a manner that its flared portion is pressed by the flare nut from therearound, durability thereof can be improved more than when it is connected by brazing.

Figure 9A:
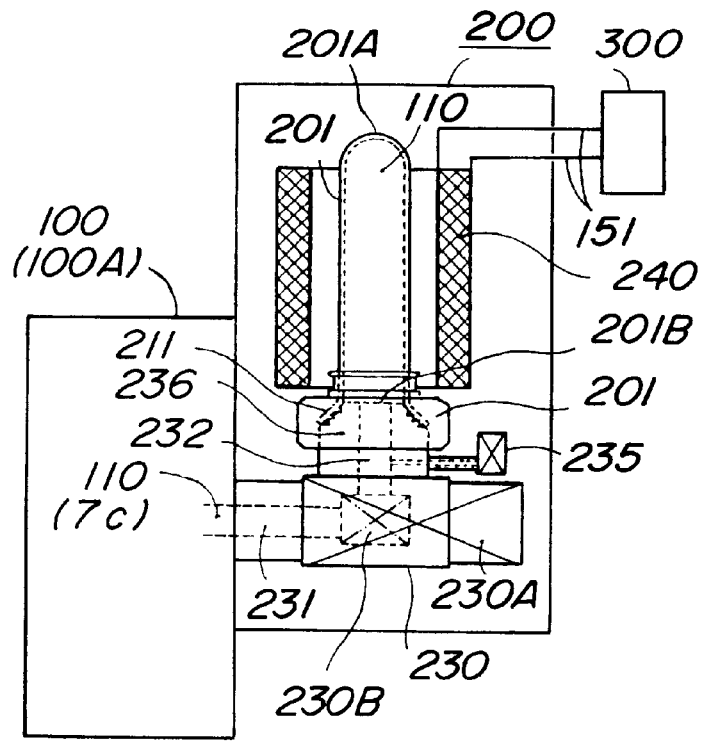
FIG. 9A is a block diagram of a hydrogen discharger according to the present invention.
Figure 9C:
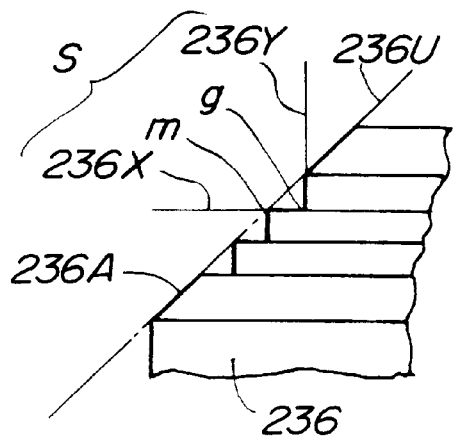
FIG. 9C is an enlarged view of a stepped portion.
Figure 9B:
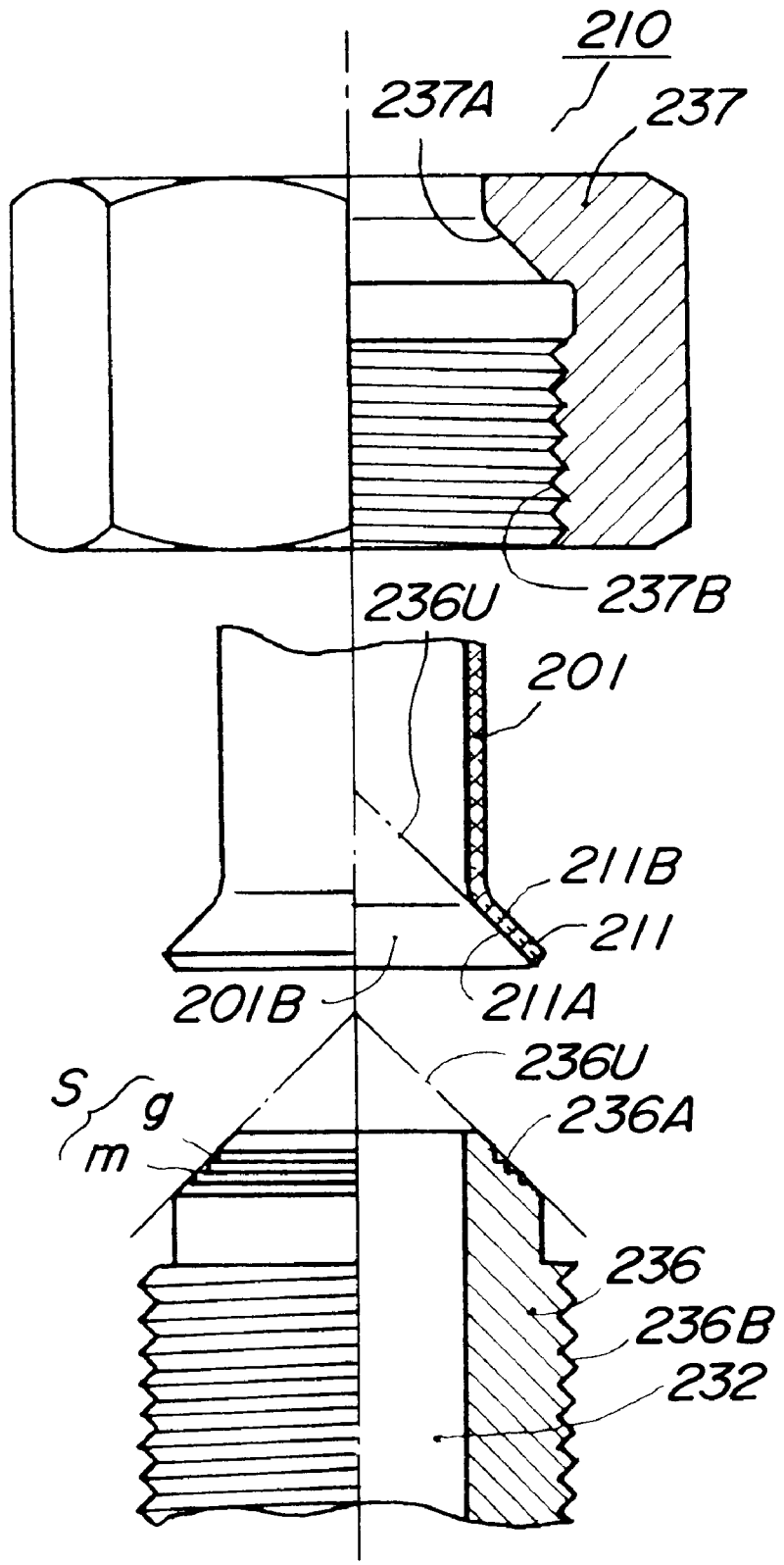
FIG. 9B is an exploded front view/longitudinal sectional view of key parts of FIG. 9A

Another embodiment of the present invention will be described with reference to FIGS. 9A, 9B and 9C. In FIGS. 9A to 9C, parts denoted by the same reference symbols as those of FIGS. 11A to 14 have the same functions as those of FIGS. 11A to 14.

Figure 11A:
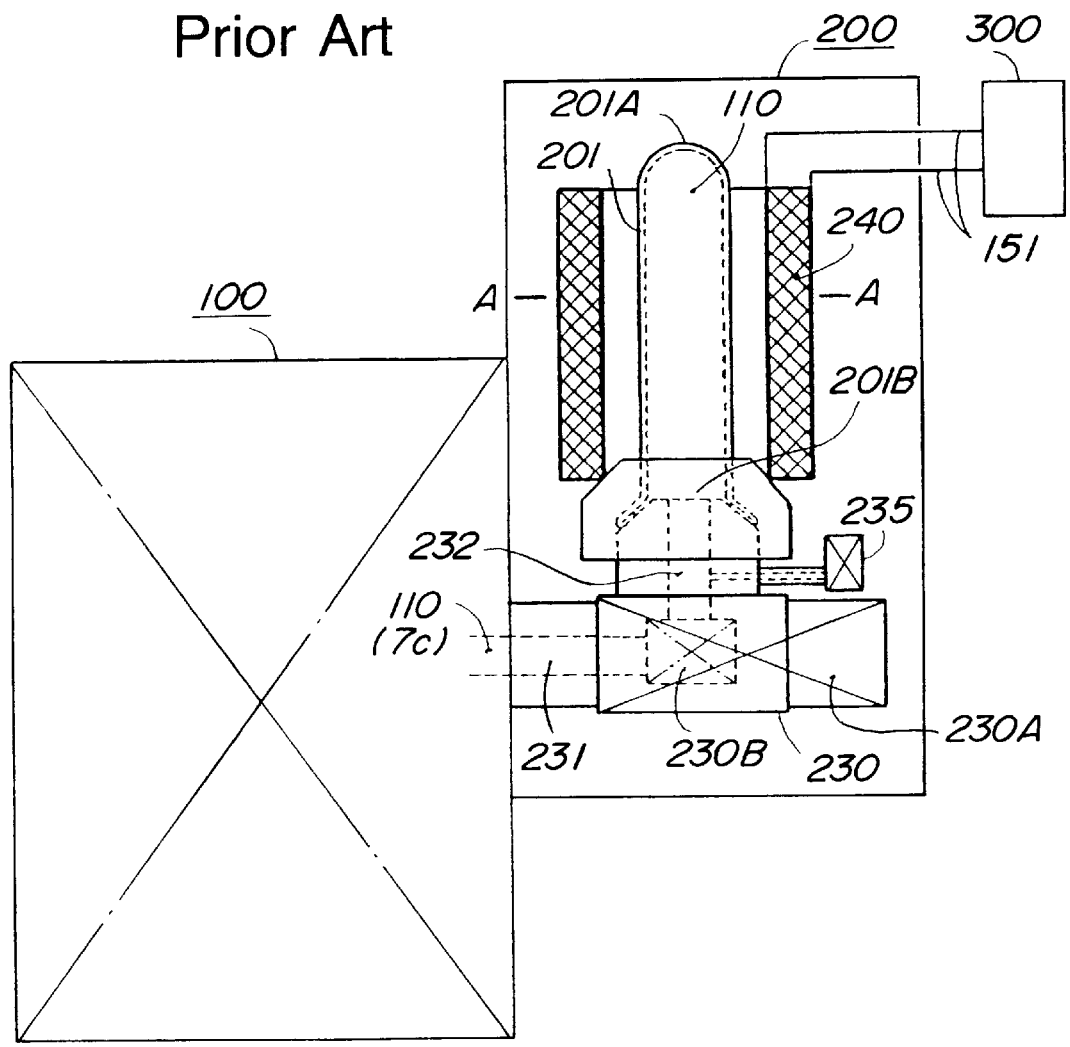
FIG. 11A is a block diagram of a hydrogen discharger according to the prior art and FIG. 11B is a transverse sectional view of key parts of FIG. 11A.
Figure 11B:
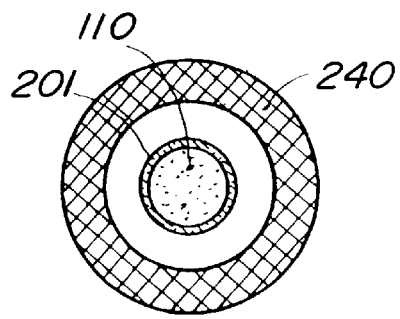

The difference of the constitution of this embodiment from the constitution of the first prior art shown in FIG. 11A is that a portion where an inner surface 211A shaped like the outer surface of a cone (to be referred to as "conical inner surface" in the present invention) of the open portion 201B of the palladium cell 201 which is the hydrogen discharge pipe and an outer surface 236A shaped like the outer surface of a cone (to be referred to as "conical outer surface" in the present invention) of the nozzle portion 236 which is the open portion of the introduction pipe for introducing the hydrogen-gas containing gas 110 into the palladium cell 201 from the passage 232 face each other and are in contact with each other, that is, an introduction portion 210 is constituted as follows.

That is, the conical outer surface 236A is formed as a stepped conical outer surface to change the shape of the conical inner surface 211A, thereby strictly preventing the leakage of the hydrogen-containing gas 110 from a gap between the conical inner surface 211A and the conical outer surface 236A.

The conical outer surface 236A is made a stepped conical outer surface by forming a stepped portion S having a series of annular groove portions g, each formed by a recessed surface 236X parallel to the direction of the center of the nozzle portion 236 and a recessed surface 236Y perpendicular to the recessed surface 236X and annular mountain portions m as shown in FIG. 9C. The end of the mountain portion m is formed to have the same height as that of the conical surface 236U of the conical outer surface 236A.

The introduction portion 210 constituted as described above is formed by the nozzle portion 236, the open portion 201B of the palladium cell 201 and a box nut 237 having an application surface 237A to be contacted to the outer surface 211B of the flare 211. A threaded portion 237B formed in the box nut 237 is screwed into a screw portion 236B formed in the nozzle portion 236 to press the conical inner surface 211A against the conical outer surface 236A for sealing.

The material of the stepped conical outer surface 236A is preferably a material harder than the material of the flare 211, that is, palladium or palladium alloy, such as high carbon steel or stainless steel hardened by bluing. Thereby, strict sealing can be maintained against repetitions of normal temperature and heating temperature by changing the shape of the conical inner surface 211A of the flare 211 according to the stepped portion S when the above conical inner surface 211A is pressed against the conical outer surface 236A for sealing.

Figure 12A:
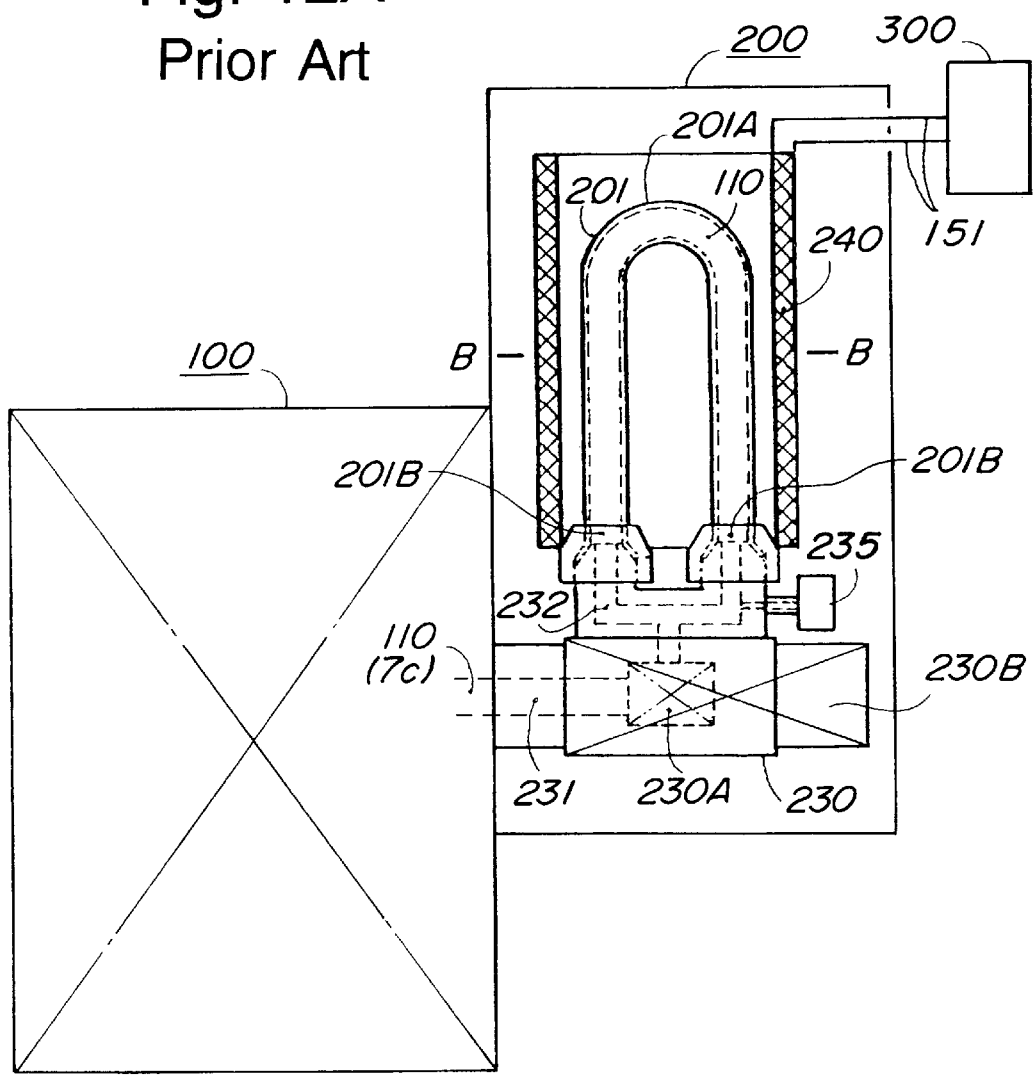
FIG. 12A is a block diagram of a hydrogen discharger according to the prior art and FIG. 12B is a transverse sectional view of key parts of FIG. 12A.
Figure 12B:
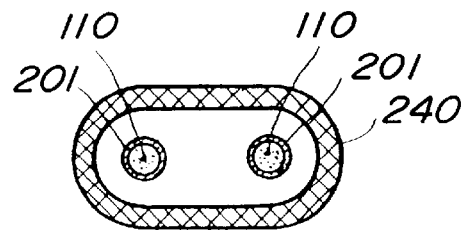
Figure 14:
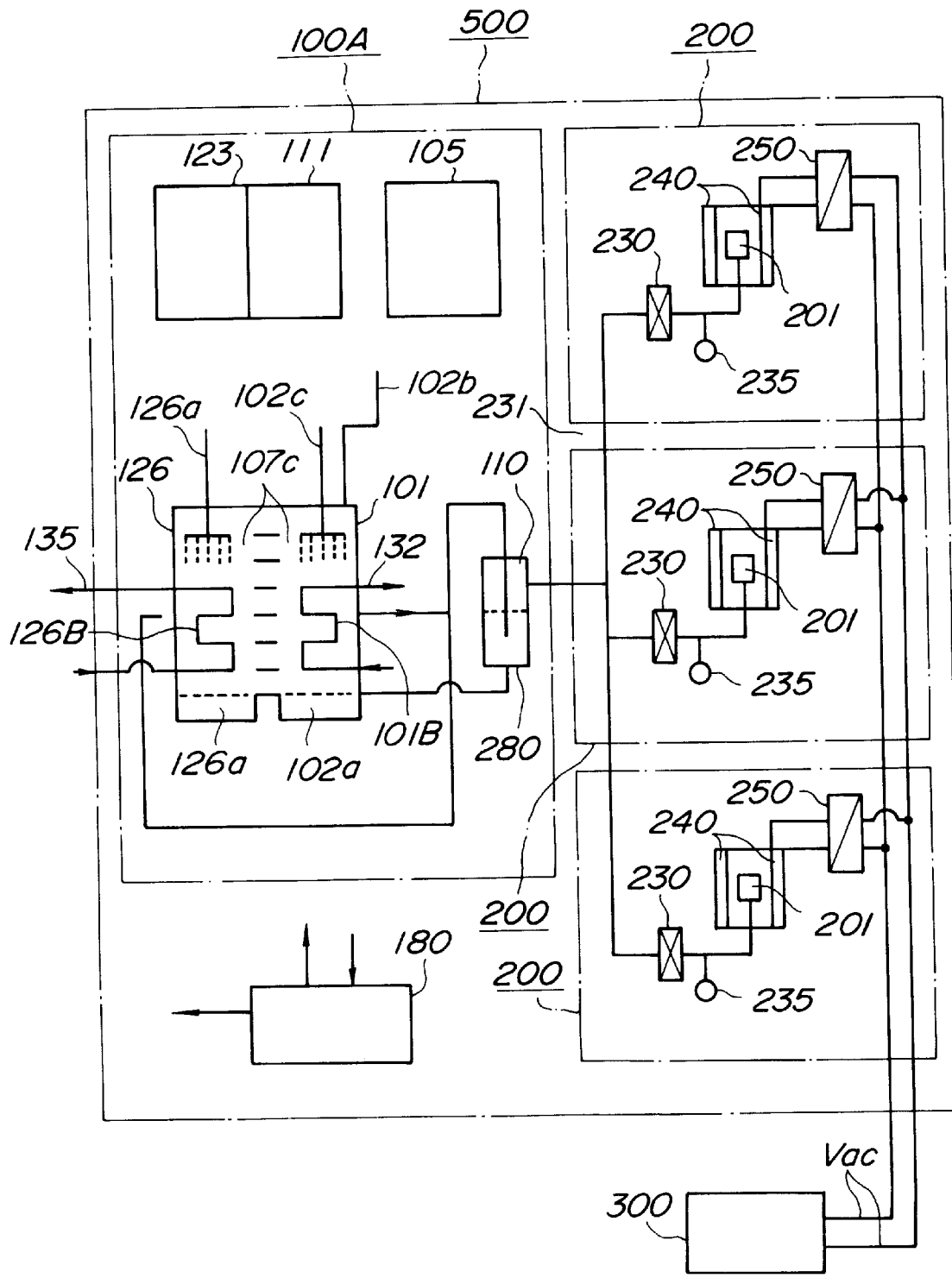
FIG. 14 is a block diagram of a absorption type refrigerating apparatus comprising a plurality of hydrogen dischargers.

The constitution of the above embodiment can be applied in the introduction portion 210 for the hydrogen-containing gas 110 of the open portion 201B of the palladium cell 201 of the first prior art shown in FIG. 12A.

Another embodiment of the present invention will be described with reference to FIGS. 10A to 10C. In this embodiment, the material of the palladium cell 201 is palladium alloy comprising 20 to 30% of silver and the balance consisting of palladium, particularly palladium alloy comprising about 23% of silver and the balance consisting of palladium.

Figure 10A:
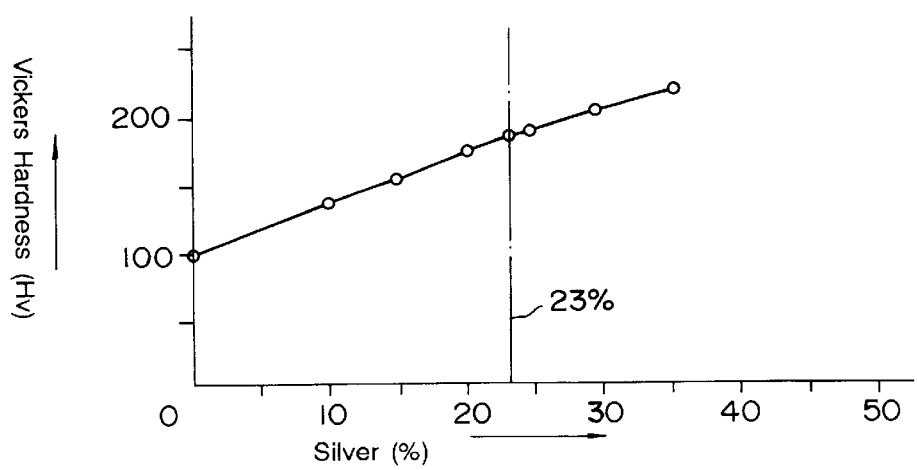
FIG. 10A is a graph showing the results of a Vickers hardness test.
Figure 10B:
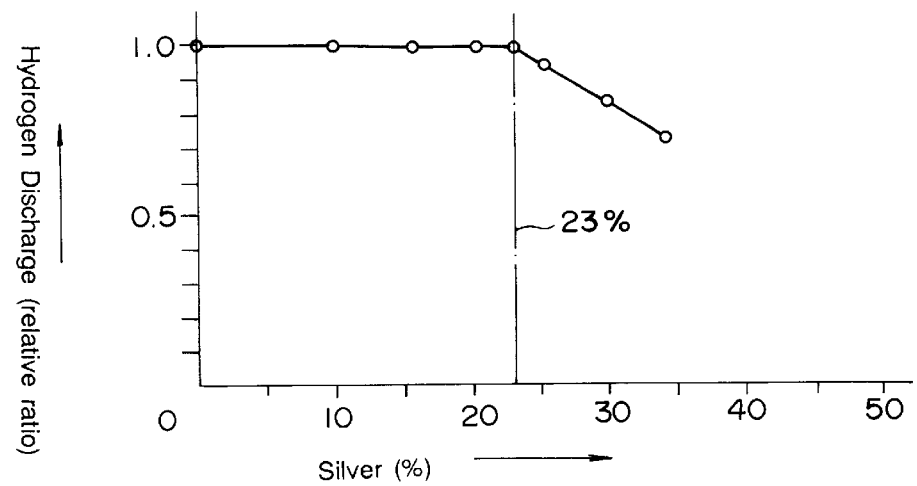
FIG. 10B is a graph showing the results of a hydrogen discharge test.
Figure 10C:
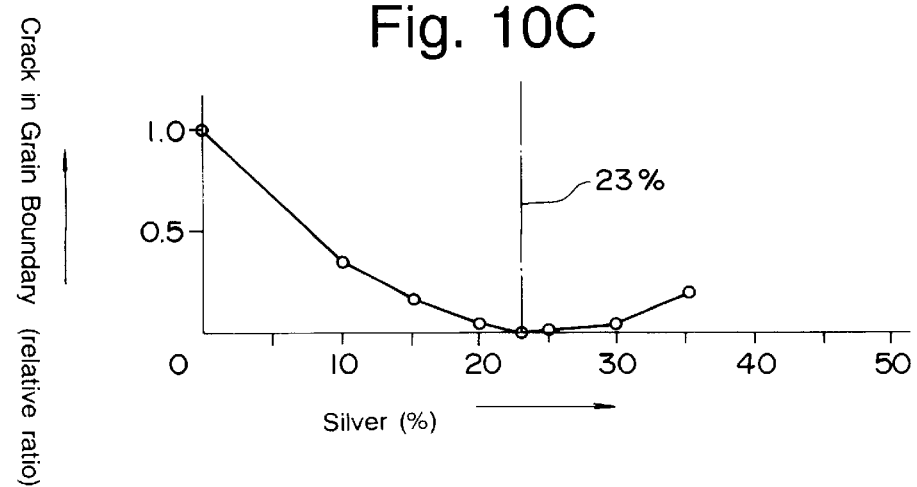
FIG. 10C is a graph showing the results of a heat damage test.

The palladium alloy having a composition which is judged as suitable based on the fact that properties shown in FIGS. 10A to 10C were obtained from a Vickers hardness test, hydrogen discharge test and heat damage test is used to constitute the present invention.

The Vickers hardness test is to measure a change in Vickers hardness Hv by changing the percentage of silver content. The hydrogen discharge test is to measure a change in the discharge of hydrogen by changing the percentage of silver content, that is, a change in the discharge of hydrogen when the palladium alloy is heated at 300° C. The heat damage test is to measure and compare the length of a crack in the grain boundary of a crystal grown in the palladium alloy after 300 repetitions of a temperature increasing/decreasing cycle between 90° C. and 400° C.

In the Vickers hardness test, when the percentage of silver content was 0%, the Vickers hardness was about 100 Hv and when the percentage of silver content was 23%, the Vickers hardness was about 190 Hv. In the hydrogen discharge test, there was no difference between when the percentage of silver content was 0% and when it was 23%. In the heat damage test, when the percentage of silver content was smaller than 10%, there was a large crack in the grain boundary and when it was 23%, there was no crack in the grain boundary and when it was 35%, the number of cracks in the grain boundary markedly increased.

Judging from the results of these tests, in the heat damage test which is the most important for hydrogen discharge operation, when the percentage of silver content is 20 to 30%, a crack in the grain boundary will cause no inconvenience in practical application. Therefore, the percentage of silver content in the palladium alloy can be expanded to 20 to 30%. Particularly, when the percentage of silver content is 23%, there is completely no crack in the grain boundary. Therefore, the palladium alloy containing 23% of silver is the best material. It can be judged from the characteristics of the Vickers hardness test and hydrogen discharge test that a palladium alloy containing 20 to 30% of silver has hardness and the discharge of hydrogen in practical ranges.

It can be further judged that a palladium alloy containing less than 20% of silver is satisfactory in terms of the discharge of hydrogen but cannot be actually used because a crack in the grain boundary is large and that a palladium alloy containing more than 30% of silver is not suitable for practical use in terms of a crack in the grain boundary, hardness and the discharge of hydrogen.

The present invention may be modified as follows.
(1) The end of the mountain portion m of the stepped portion S of the conical outer surface 236A is projected outward from the conical shape 236U by a distance $\frac{1}{10}$ to $\frac{1}{5}$ the thickness of the flare 211.
(2) The shapes of the groove portion g and the mountain portion m of the stepped portion S of the conical outer surface 236A are made acute, obtuse or round.
(3) The present invention is applied to the constitution of the first prior art, second prior art or third prior art shown in FIGS. 11A to 14.
(4) The flare 21 is turned up inside to be doubled or turned up outside to be doubled like the first prior art of FIG. 12A.

As described above, according to the present invention, since a portion where a stepped conical outer surface and a conical inner surface are in contact with each other is formed in an introduction portion for introducing hydrogen-containing gas into the hydrogen discharge pipe, palladium or palladium alloy constituting the hydrogen discharge pipe is deformed by the stepped potion to carry out perfect sealing. Therefore, a hydrogen discharger which can be strictly kept sealed against repetitions of normal temperature and heating temperature and an apparatus comprising the same, for example, an absorption type refrigerating apparatus, can be provided.

Further, according to the present invention, since the palladium alloy can contain 20 to 30% of silver compared with the palladium alloy of the prior art which contains 25% of silver, various palladium alloys suitable for hydrogen discharge applications can be used. A palladium alloy containing about 23% of silver is the best for any hydrogen discharge applications.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A hydrogen discharger comprising a heater, a hydrogen discharge pipe, having one closed end, for introducing hydrogen-containing gas from the other open end, permeating hydrogen from inside by heating with the heater and discharging hydrogen to the outside, and an introduction pipe, connected to the hydrogen discharge pipe, for introducing the hydrogen-containing gas into the hydrogen discharge pipe, wherein a plurality of the hydrogen discharge pipes are provided, the heater is located between adjacent hydrogen discharge pipes, and the hydrogen discharge pipes are arranged symmetrical about and adjacent to the heater.

2. The hydrogen discharger of claim 1, wherein a heater protection tube for storing the heater arranged at the center and hydrogen discharge pipe protection tubes for storing the hydrogen discharge pipes arranged adjacent to the heater protection tube in a circumferential direction, are provided, and the protection tubes are made from a high heat conductive material.

3. The hydrogen discharger of claim 2, wherein air holes for discharging permeated hydrogen to the outside are formed through the hydrogen discharge pipe protection tubes.

4. The hydrogen discharger of claim 3, wherein a heat insulating material for covering the outer surfaces of the heater protection tube and the hydrogen discharge pipe protection tubes is provided, and air holes for discharging permeated hydrogen to the outside are formed through the hydrogen discharge pipe protection tubes and the heat insulating material.

5. The hydrogen discharger of claim 1, wherein the hydrogen discharge pipe is connected to the introduction pipe by placing a flared end portion thereof on a truncated conical portion formed in the open end portion of the introduction pipe and pressing them with a flare nut from therearound.

6. The hydrogen discharger of claim 5, wherein the hydrogen discharge pipe protection tube is attached by fitting the hydrogen discharge pipe protection tube onto the flare nut, screwing a screw into a screw hole formed through the side surface of the hydrogen discharge pipe protection tube and inserting the end of the screw into an annular groove formed around the upper end of the flare nut.

7. The hydrogen discharger of claim 1, wherein a gas/liquid separator provided in an absorption type refrigerator is communicated with an uncondensed gas tank through a communication pipe equipped with a stop valve and a plurality of the hydrogen dischargers are installed in the uncondensed gas tank.

8. The hydrogen discharger of claim 1, wherein a protecting plate for protecting the heater and the plurality of hydrogen discharge pipes is provided.

9. The hydrogen discharger of claim 1, wherein a protecting case for protecting the heater and the plurality of hydrogen discharge pipes is provided.

10. A hydrogen discharger comprising a heater, a hydrogen discharge pipe, having one closed end and made from palladium or palladium alloy, for introducing hydrogen-containing gas from the other open end, permeating hydrogen from inside by heating with the heater and discharging hydrogen to the outside, and an introduction pipe, connected to the hydrogen discharge pipe, for introducing the hydrogen-containing gas into the hydrogen discharge pipe, wherein the open end portion of the hydrogen discharge pipe has a conical inner surface, and the introduction pipe has a nozzle portion with a stepped conical outer surface having a series of annular groove portions and annular mountain portions, which is in contact with the conical inner surface of the hydrogen discharge pipe to change the shape of the conical inner surface of the hydrogen discharge pipe and an introduction hole for introducing the hydrogen-containing gas.

11. The hydrogen discharger of claim 10, wherein the palladium alloy contains 20% or more and 30% or less of silver and the balance consisting of palladium.

12. The hydrogen discharger of claim 10, wherein the palladium alloy contains about 23% of silver and the balance consisting of palladium.

13. An absorption type refrigerating apparatus comprising the hydrogen discharger of claim 1.

14. An absorption type refrigerating apparatus comprising the hydrogen discharger of claim 10.

15. An absorption type refrigerating apparatus comprising the hydrogen discharger of claim 11.

16. An absorption type refrigerating apparatus comprising the hydrogen discharger of claim 12.

* * * * *